(12) United States Patent
Shimura

(10) Patent No.: US 7,350,407 B2
(45) Date of Patent: Apr. 1, 2008

(54) INSTALLATION STRUCTURE FOR ELECTRONIC COMPONENT FOR TIRE

(75) Inventor: Kazuhiro Shimura, Hiratsuka (JP)

(73) Assignee: The Yokohama Rubber Co., Ltd, Tokyo (JP)

( * ) Notice: Subject to any disclaimer, the term of this patent is extended or adjusted under 35 U.S.C. 154(b) by 0 days.

(21) Appl. No.: 10/546,271

(22) PCT Filed: Mar. 24, 2004

(86) PCT No.: PCT/JP2004/004054

§ 371 (c)(1),
(2), (4) Date: Aug. 22, 2005

(87) PCT Pub. No.: WO2004/087438

PCT Pub. Date: Oct. 14, 2004

(65) Prior Publication Data

US 2006/0144133 A1 Jul. 6, 2006

(30) Foreign Application Priority Data

Mar. 31, 2003 (JP) .............................. 2003-094870

(51) Int. Cl.
*G01M 17/02* (2006.01)
(52) U.S. Cl. ....................................................... 73/146
(58) Field of Classification Search ........ 73/146–146.8
See application file for complete search history.

(56) References Cited

U.S. PATENT DOCUMENTS

| 6,161,430 | A  | * | 12/2000 | Koch et al. .................. 73/146 |
| 6,549,125 | B2 | * | 4/2003  | Nigon et al. ................. 340/447 |
| 6,655,203 | B2 | * | 12/2003 | Hsu .......................... 73/146.8 |
| 6,694,807 | B2 | * | 2/2004  | Chuang et al. ............. 73/146.5 |
| 6,739,187 | B2 | * | 5/2004  | Luce ......................... 73/146.8 |
| 6,805,000 | B1 | * | 10/2004 | Sheikh-Bahaie ........... 73/146.8 |
| 6,868,717 | B2 | * | 3/2005  | Koch et al. .................. 73/146 |
| 7,017,403 | B2 | * | 3/2006  | Normann et al. .......... 73/146.2 |
| 7,021,133 | B1 | * | 4/2006  | Hsu .......................... 73/146.8 |
| 2007/0103285 | A1 | * | 5/2007 | Konno et al. .............. 340/447 |

FOREIGN PATENT DOCUMENTS

| JP | 60-71306 A | 4/1985 |
| JP | 10-315720 A | 12/1998 |
| JP | 10-504783 | 12/1998 |

(Continued)

OTHER PUBLICATIONS

International Search Report mailed on Jul. 27, 2004.

*Primary Examiner*—Andre J. Allen
*Assistant Examiner*—Jermaine Jenkins
(74) *Attorney, Agent, or Firm*—Greer, Burns & Crain, Ltd

(57) ABSTRACT

An installation structure for an electronic component for a tire, where a case for the electronic component attached to a rim well portion can be prevented from being destroyed during attachment and removal of the tire to and from a wheel. In the installation structure, the electronic component received in the case is attached to the rim well portion in a tire air chamber. When the case is subjected to external force applied in the radial direction of the tire, the case is positionally released from a fixed state before it is destroyed by the force.

5 Claims, 4 Drawing Sheets

FOREIGN PATENT DOCUMENTS

| | | |
|---|---|---|
| JP | 2000-103257 A | 4/2000 |
| JP | 2002-541003 A | 12/2002 |
| JP | 2003-182322 A | 7/2003 |
| JP | 2003-312221 A | 11/2003 |
| JP | 2004-106768 A | 4/2004 |
| WO | WO-02/081238 A1 | 10/2002 |

* cited by examiner

INSTALLATION STRUCTURE FOR ELECTRONIC COMPONENT FOR TIRE

TECHNICAL FIELD

The present invention relates to an installation structure in which an electronic component for detecting information inside a tire such as an air pressure and a temperature is attached to a rim well portion in a tire air chamber. More particularly, the present invention relates to an installation structure for an electronic component for a tire, where a case for the electronic component attached to a rim well portion is prevented from being destroyed during attachment and removal of the tire to and from a wheel.

BACKGROUND ART

In order to monitor information inside a tire, such as an air pressure and a temperature, there has been heretofore performed attachment of a sensor unit to a well portion of a rim, detection of the information inside the tire by use of the sensor unit, and transmission of the result to a receiver outside of the tire by utilizing radio waves (for example, see Japanese patent application Kohyo publication No. Hei 10(1998)-504783).

However, if the sensor unit is attached to the well portion of the rim, a bead toe portion of the tire comes into contact with the sensor unit during attachment and removal of the tire to and from the wheel, particularly, when the tire is removed from the rim. Accordingly, a case for receiving the electronic component is often destroyed.

SUMMARY OF THE INVENTION

It is an object of the present invention to provide an installation structure for an electronic component for a tire, where a case for the electronic component attached to a rim well portion can be prevented from being destroyed during attachment and removal of the tire to and from a wheel.

An installation structure for an electronic component for a tire of the present invention to achieve the foregoing object is a structure, in which the electronic component received in a case is attached to a rim well portion in a tire air chamber, characterized in that an attachment force of the case to the rim well portion is set to be smaller than a breaking stress of the case.

Here, setting the attachment force of the case to the rim well portion to be smaller than the breaking stress of the case means that, when the case is subjected to external force applied in an axial direction of the tire, the case is separated from the rim well portion before it is destroyed by the force.

Moreover, an installation structure for an electronic component for a tire of the present invention to achieve the foregoing object is a structure, in which the electronic component received in a case is attached to a rim well portion in a tire air chamber, characterized in that a base is previously attached to the rim well portion, the case is attached to the base, and an attachment force of the base to the rim well portion is set to be smaller than a breaking stress of the case.

Here, setting the attachment force of the base to the rim well portion to be smaller than the breaking stress of the case means that, when the case is subjected to external force applied in an axial direction of the tire, the base is separated from the rim well portion before the case is destroyed by the force.

Furthermore, an installation structure of the present invention for an electronic component for a tire to achieve the foregoing object is a structure, in which the electronic component received in a case is attached to a rim well portion in a tire air chamber, characterized in that a base is previously attached to the rim well portion, the case is attached to the base, and a mechanical strength of the base is set to be lower than a mechanical strength of the case.

Here, setting the mechanical strength of the base to be lower than the mechanical strength of the case means that, when the case is subjected to external force applied in an axial direction of the tire, the base is deformed or destroyed before the case is destroyed by the force, and the case is separated from the base.

Furthermore, an installation structure of the present invention for an electronic component for a tire to achieve the foregoing object is a structure, in which the electronic component received in a case is attached to a rim well portion in a tire air chamber, characterized in that a base is previously attached to the rim well portion, the case is attached to the base by means of a binding member, and a mechanical strength of the binding member is set to be lower than a mechanical strength of the case.

Here, setting the mechanical strength of the binding member to be lower than the mechanical strength of the case means that, when the case is subjected to external force applied in an axial direction of the tire, the binding member is deformed or destroyed before the case is destroyed by the force, and the case is separated from the base.

Furthermore, an installation structure of the present invention for an electronic component for a tire to achieve the foregoing object is a structure, in which the electronic component received in a case is attached to a rim well portion in a tire air chamber, characterized in that a base is previously attached to the rim well portion, the case is attached to the base by means of a fitting mechanism, the fitting mechanism allows only slide of the case in an axial direction of the tire, and fitting of the base and the case is released by the slide. Specifically, when the case is subjected to external force applied in an axial direction of the tire, the case is separated from the base before the case is destroyed by the force.

In the present invention, when the case for receiving the electronic component is subjected to external force applied in a radial direction of the tire, the case is positionally released from a fixed state before it is destroyed by the force and set to be in a freely movable state. Therefore, even if a bead toe portion of the tire comes into contact with the case for the electronic component during attachment and removal of the tire to and from a wheel, the case is unlikely to be destroyed. As a result, a sensor unit including the electronic component and the case can be efficiently reused.

Note that the electronic component means a pressure sensor, a temperature sensor, a transmitter, a receiver, a control circuit, a battery or the like. These electronic components are usually received in a case and unitized.

DESCRIPTION OF THE PREFERRED EMBODIMENTS

With reference to the accompanying drawings, a configuration of the present invention will be described in detail below.

Figure 1:
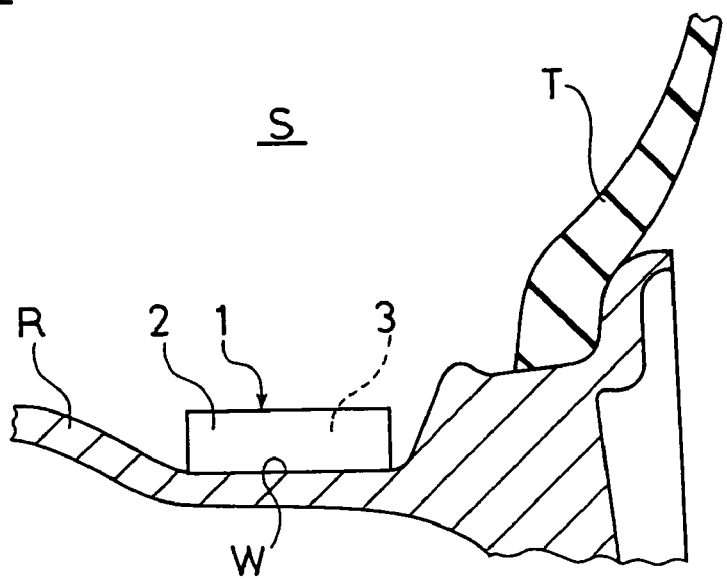
FIG. 1 is a cross-sectional view schematically showing an installation structure for an electronic component for a tire according to a first embodiment of the present invention.

FIG. 1 shows an installation structure for an electronic component for a tire according to a first embodiment of the present invention. In FIG. 1, R denotes a rim, T denotes a tire, and S denotes a tire air chamber. In the structure of this embodiment, a sensor unit 1 for detecting information inside the tire is attached to a well portion W of the rim R. The sensor unit 1 includes an electronic component 3 inside a case 2 made of resin, measures an air pressure of the tire T and an internal temperature thereof, and transmits the results to the outside of the tire.

The case 2 of the sensor unit 1 is fixed to the well portion W of the rim R by use of mechanical attachment means such as screws or by adhesion. An attachment force of the case 2 to the well portion W is set to be smaller than a breaking stress of the case 2.

In the installation structure thus configured for an electronic component for a tire, during attachment and removal of the tire T to and from a wheel, when a bead toe portion of the tire T comes into contact with the case 2 of the sensor unit 1, and the case 2 is subjected to external force applied in an axial direction of the tire, the case 2 is separated from the well portion W before it is destroyed by the force. Thus, during attachment and removal of the tire T to and from the wheel, the case 2 for receiving the electronic component 3 is never destroyed, and the sensor unit 1 can be reused.

Figure 2:
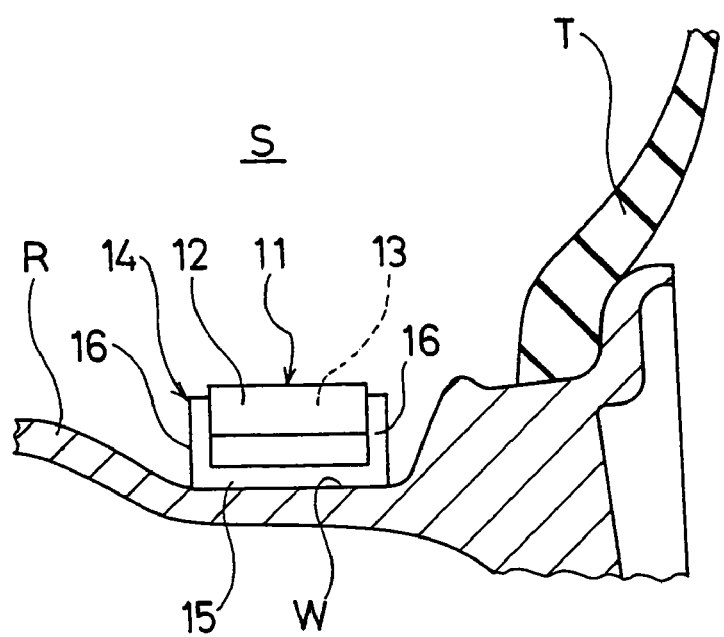
FIG. 2 is a cross-sectional view schematically showing an installation structure for an electronic component for a tire according to a second embodiment of the present invention.

FIG. 2 shows an installation structure for an electronic component for a tire according to a second embodiment of the present invention. In FIG. 2, R denotes a rim, T denotes a tire, and S denotes a tire air chamber. In the structure of this embodiment, a sensor unit 11 for detecting information inside the tire is attached to a well portion W of the rim R by means of a base 14. The sensor unit 11 includes an electronic component 13 inside a case 12 made of resin, measures an air pressure of the tire T and an internal temperature thereof, and transmits the results to the outside of the tire.

The base 14 includes at least a pair of locking parts 16 and 16 which are protruded from a bottom part 15. These locking parts 16 and 16 lock the case 12 of the sensor unit 11 by sandwiching the case.

The base 14 is fixed to the well portion W of the rim R by use of mechanical attachment means such as screws or by adhesion. An attachment force of the base 14 to the well portion W is set to be smaller than a breaking stress of the case 12.

In the installation structure thus configured for an electronic component for a tire, during attachment and removal of the tire T to and from a wheel, when a bead toe portion of the tire T comes into contact with the case 12 of the sensor unit 11 or the base 14, and the case 12 is subjected to external force applied in an axial direction of the tire, the base 14 is separated from the well portion W before the case 12 is destroyed by the force. Thus, during attachment and removal of the tire T to and from the wheel, the case 12 for receiving the electronic component 13 is never destroyed, and the sensor unit 11 can be reused.

Figure 3:
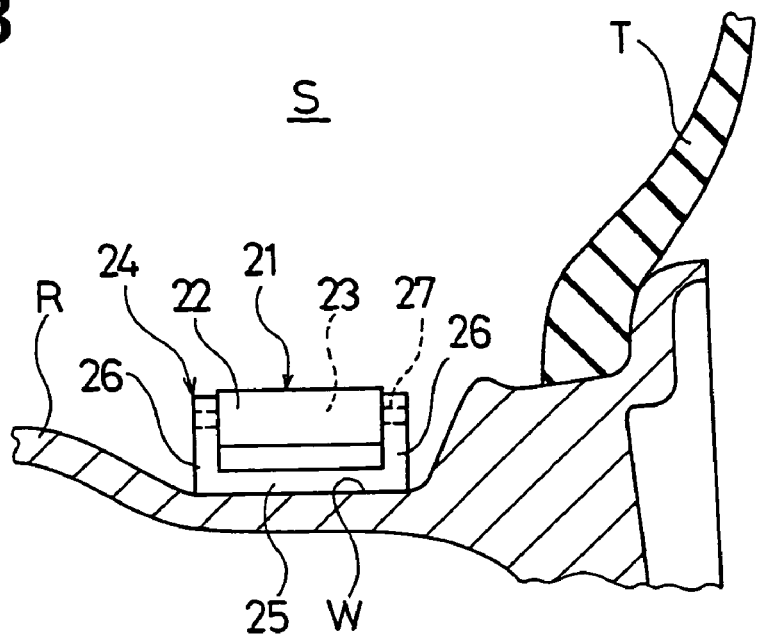
FIG. 3 is a cross-sectional view schematically showing an installation structure for an electronic component for a tire according to a third embodiment of the present invention.
Figure 4:
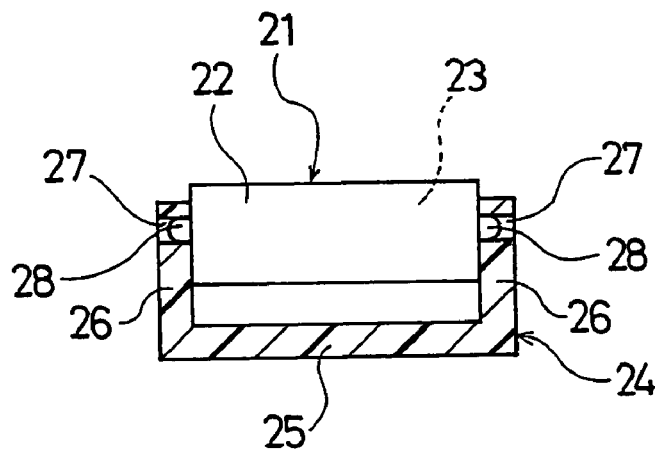
FIG. 4 is a front view showing a partially cut out sensor unit and base, which are used in the installation structure for an electronic component for a tire according to the third embodiment of the present invention.
Figure 5:
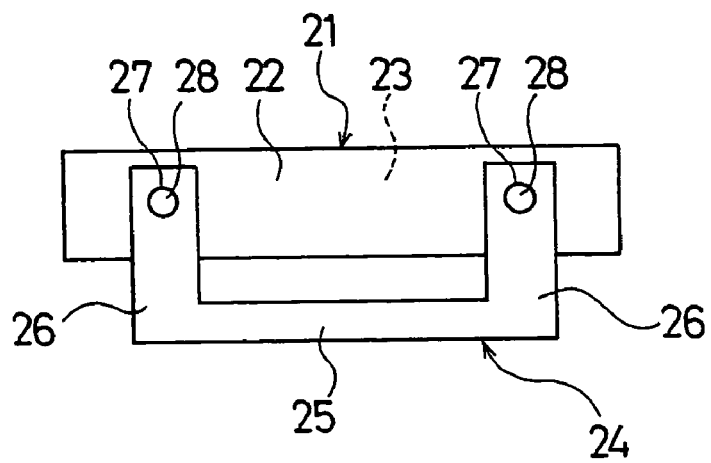
FIG. 5 is a side view showing the sensor unit and the base, which are used in the installation structure for an electronic component for a tire according to the third embodiment of the present invention.

FIG. 3 shows an installation structure for an electronic component for a tire according to a third embodiment of the present invention. FIGS. 4 and 5 show a main part of the structure. In FIG. 3, R denotes a rim, T denotes a tire, and S denotes a tire air chamber. In the structure of this embodiment, a sensor unit 21 for detecting information inside the tire is attached to a well portion W of the rim R by means of a base 24. The sensor unit 21 includes an electronic component 23 inside a case 22 made of resin, measures an air pressure of the tire T and an internal temperature thereof, and transmits the results to the outside of the tire.

The base 24 includes at least a pair of locking parts 26 and 26 which are protruded from a bottom part 25. These locking parts 26 and 26 lock the case 22 of the sensor unit 21 by sandwiching the case. As shown in FIGS. 4 and 5, the respective locking parts 26 of the base 24 have holes 27 formed therein, and protrusions 28 are provided at positions corresponding to the holes 27 in the case 22 of the sensor unit 21. Specifically, the case 22 is attached to the base 24 while deforming the locking parts 26 and 26 outward. In the attachment state described above, the case 22 is locked to the base 24 by inserting the protrusions 28 into the holes 27.

The base 24 is fixed to the well portion W of the rim R by use of mechanical attachment means such as screws or by adhesion. A mechanical strength of the base 24 is set to be lower than a mechanical strength of the case 22.

In the installation structure thus configured for an electronic component for a tire, during attachment and removal of the tire T to and from a wheel, when a bead toe portion of the tire T comes into contact with the case 22 of the sensor unit 21 or the base 24, and the case 22 is subjected to external force applied in an axial direction of the tire, the base 24 is deformed or destroyed before the case 22 is destroyed by the force. Accordingly, the case 22 is separated from the base 24. Thus, during attachment and removal of the tire T to and from the wheel, the case 22 for receiving the electronic component 23 is never destroyed, and the sensor unit 21 can be reused.

Figure 6:
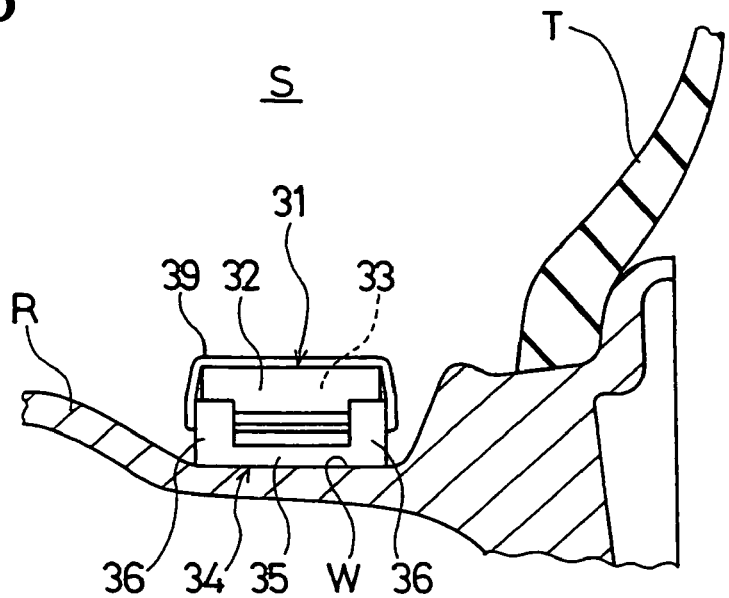
FIG. 6 is a cross-sectional view schematically showing an installation structure for an electronic component for a tire according to a fourth embodiment of the present invention.
Figure 7:
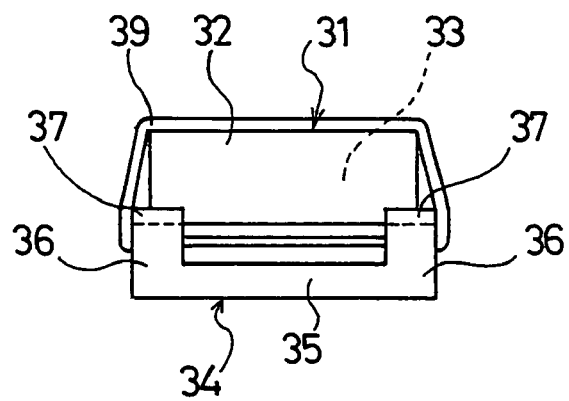
FIG. 7 is a front view showing a sensor unit and a base, which are used in the installation structure for an electronic component for a tire according to the fourth embodiment of the present invention.
Figure 8:
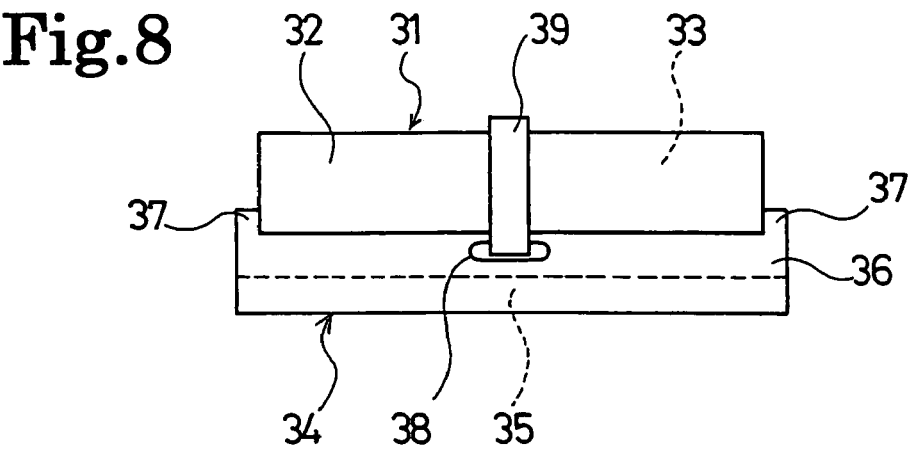
FIG. 8 is a side view showing the sensor unit and the base, which are used in the installation structure for an electronic component for a tire according to the fourth embodiment of the present invention.

FIG. 6 shows an installation structure for an electronic component for a tire according to a fourth embodiment of the present invention. FIGS. 7 and 8 show a main part of the structure. In FIG. 6, R denotes a rim, T denotes a tire, and S denotes a tire air chamber. In the structure of this embodiment, a sensor unit 31 for detecting information inside the tire is attached to a well portion W of the rim R by means of a base 34. The sensor unit 31 includes an electronic component 33 inside a case 32 made of resin, measures an air pressure of the tire T and an internal temperature thereof, and transmits the results to the outside of the tire.

As shown in FIGS. 7 and 8, the base 34 includes at least a pair of supporting parts 36 and 36 which are protruded from a bottom part 35. In these supporting parts 36 and 36, claws 37 and 37 are formed, which control movement of the case 32 in a circumferential direction of the tire, respectively. Moreover, the respective supporting parts 36 have holes 38 formed therein, and a binding member 39 such as a band is provided around the case 32 through these holes 38. Specifically, the case 32 is attached to the base 34 by use of the binding member 39.

The base 34 is fixed to the well portion W of the rim R by use of mechanical attachment means such as screws or by adhesion. A mechanical strength of the binding member 39 is set to be lower than a mechanical strength of the case 32. To be more specific, the binding member 39 can hold the case 32 against force such as centrifugal force assumed to be generated during running. However, the binding member 39 is deformed or broken if much greater force is applied thereto.

In the installation structure thus configured for an electronic component for a tire, during attachment and removal of the tire T to and from a wheel, when a bead toe portion of the tire T comes into contact with the case 32 of the sensor unit 31, the base 34 or the binding member 39, and the case 32 is subjected to external force applied in an axial direction of the tire, the binding member 39 is deformed or destroyed before the case 32 is destroyed by the force. Accordingly, the case 32 is separated from the base 34. Thus, during attachment and removal of the tire T to and from the wheel, the case 32 for receiving the electronic component 33 is never destroyed, and the sensor unit 31 can be reused.

Figure 9:
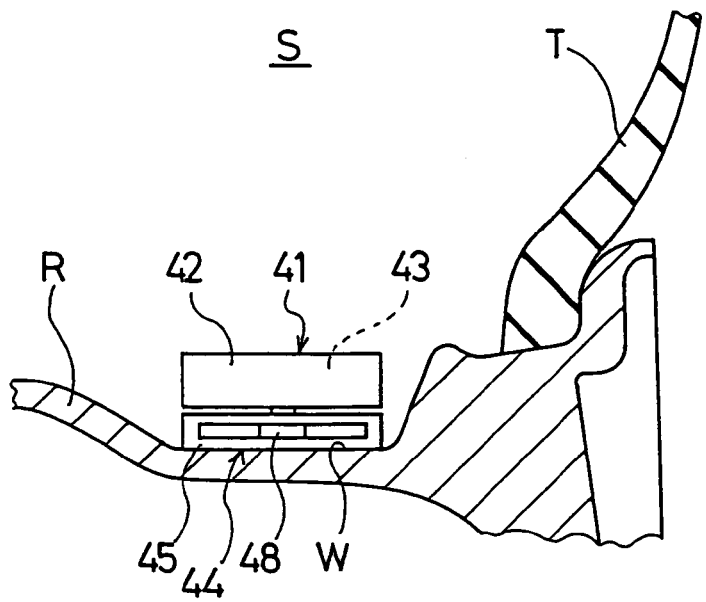
FIG. 9 is a cross-sectional view schematically showing an installation structure for an electronic component for a tire according to a fifth embodiment of the present invention.
Figure 10:
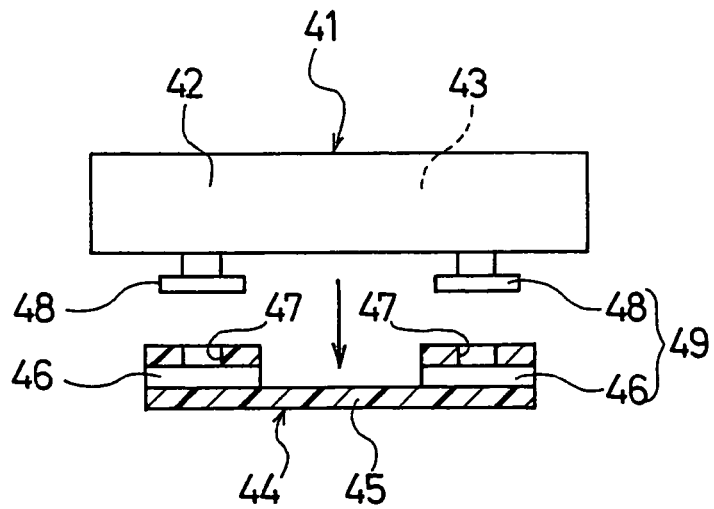
FIG. 10 is a side view showing a partially cut out sensor unit and base, which are used in the installation structure for an electronic component for a tire according to the fifth embodiment of the present invention.
Figure 11:
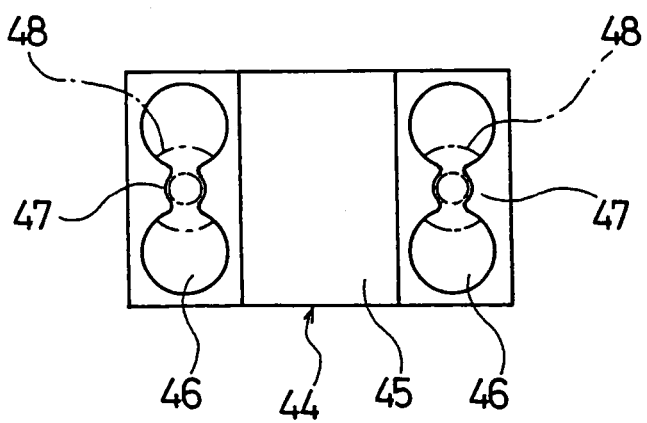
FIG. 11 is a plan view showing the base used in the installation structure for an electronic component for a tire according to the fifth embodiment of the present invention.

FIG. 9 shows an installation structure for an electronic component for a tire according to a fifth embodiment of the present invention. FIGS. 10 and 11 show a main part of the structure. In FIG. 9, R denotes a rim, T denotes a tire, and S denotes a tire air chamber. In the structure of this embodiment, a sensor unit 41 for detecting information inside the tire is attached to a well portion W of the rim R by means of a base 44. The sensor unit 41 includes an electronic component 43 inside a case 42 made of resin, measures an air pressure of the tire T and an internal temperature thereof, and transmits the results to the outside of the tire. The base 44 is fixed to the well portion W of the rim R by use of mechanical attachment means such as screws or by adhesion.

As shown in FIGS. 10 and 11, the base 44 includes fitting holes 46 extended in an axial direction of the tire, respectively, on both ends of a bottom part 45. These fitting holes 46 include narrow portions 47, respectively. Meanwhile, in a lower part of the case 42, a pair of fitting protrusions 48 are provided. A base portion of each of the fitting protrusions 48 is formed to have a rod shape, and a tip portion thereof is formed to have a disc shape. This fitting protrusion 48 is inserted into the fitting hole 46, slid in the axial direction of the tire, and locked in the narrow portion 47. These fitting holes 46 and fitting protrusions 48 form a fitting mechanism 49. Specifically, this fitting mechanism 49 allows only slide of the case 42 in the axial direction of the tire, and fitting of the base 44 and the case 42 is released by the slide.

In the installation structure thus configured for an electronic component for a tire, during attachment and removal of the tire T to and from a wheel, when a bead toe portion of the tire T comes into contact with the case 42 of the sensor unit 41, and the case 42 is subjected to external force applied in the axial direction of the tire, the fitting of the base 44 and the case 42 by the fitting mechanism 49 is released before the case 42 is destroyed by the force. Accordingly, the case 42 is separated from the base 44. Thus, during attachment and removal of the tire T to and from the wheel, the case 42 for receiving the electronic component 43 is never destroyed, and the sensor unit 41 can be reused.

In the present invention, as described above, the sensor unit including the electronic component housed in the case can be protected. On the other hand, the base or the binding member may be destroyed. However, these base and binding member are inexpensive and may be replaced when destroyed. Note that materials of the base and the binding member are not particularly limited. For example, metal such as aluminum, resin, rubber, and the like can be used.

Although the embodiments of the present invention have been described in detail above, it should be understood that various changes, alternatives, and substitutions can be made without departing from the spirit and scope of the present invention, which are defined by the attached claims.

INDUSTRIAL APPLICABILITY

The present invention can be effectively utilized in tire manufacturing industries and thus in automobile manufacturing industries.

What is claimed is:

1. An installation structure for an electronic component for a tire, in which the electronic component received in a case is attached to a rim well portion in a tire air chamber, characterized in that an attachment force of the case to the rim well portion is set to be smaller than a breaking stress of the case so that, when the case is subjected to an external force applied in an axial direction of the tire, the case is separated from the rim well portion before the case is destroyed by the external force.

2. An installation structure for an electronic component for a tire, in which the electronic component received in a case is attached to a rim well portion in a tire air chamber, characterized in that a base is previously attached to the rim well portion, the case is attached to the base, and an attachment force of the base to the rim well portion is set to be smaller than a breaking stress of the case, so that when the case is subjected to an external force applied in an axial direction of the tire, the base is separated from the rim before the case is destroyed by the force.

3. An installation structure for an electronic component for a tire, in which the electronic component received in a case is attached to a rim well portion in a tire air chamber, characterized in that a base is previously attached to the rim well portion, the case is attached to the base, and a mechanical strength of the base is set to be lower than a mechanical strength of the case, so that when the case is subjected to an external force applied in an axial direction of the tire, the base is deformed or destroyed before the case is destroyed by the force, and the case is separated from the base.

4. An installation structure for an electronic component for a tire, in which the electronic component received in a case is attached to a rim well portion in a tire air chamber, characterized in that a base is previously attached to the rim well portion, the case is attached to the base by means of a binding member, and a mechanical strength of the binding member is set to be lower than a mechanical strength of the case, so that when the case is subjected to external force applied in an axial direction of the tire, the binding member is deformed or destroyed before the case is destroyed by the force, and the case is separated from the base.

5. An installation structure for an electronic component for a tire, in which the electronic component received in a case is attached to a rim well portion in a tire air chamber, characterized in that a base is previously attached to the rim well portion, the case is attached to the base by means of a fitting mechanism, the fitting mechanism allows only a slide of the case in an axial direction of the tire, and fitting of the base and the case is released by the slides, so that when the case is subjected to an external force applied in an axial direction of the tire, the case is separated from the base before the case is destroyed by the force.

* * * * *